United States Patent [19]
Tejima et al.

[11] Patent Number: 5,645,334
[45] Date of Patent: Jul. 8, 1997

[54] PROJECTOR AND FOCUSING METHOD THEREIN

[75] Inventors: Yasuyuki Tejima; Nobutaka Minefuji; Masakuni Iwanaga, all of Tokyo, Japan

[73] Assignees: Asahi Kogaku Kogyo Kabushiki Kaisha; Casio Computer Co., Ltd., both of Tokyo, Japan

[21] Appl. No.: 514,221

[22] Filed: Aug. 11, 1995

[30] Foreign Application Priority Data

Aug. 12, 1994 [JP] Japan .................................. 6-190846
Apr. 27, 1995 [JP] Japan .................................. 7-104369

[51] Int. Cl.$^6$ .................................................. G03B 21/14
[52] U.S. Cl. .................................................. 353/101; 353/38
[58] Field of Search .................................. 353/101, 38, 69, 353/31

[56] References Cited

U.S. PATENT DOCUMENTS

| | | | |
|---|---|---|---|
| 4,936,657 | 6/1990 | Tejima et al. | 353/122 |
| 5,150,138 | 9/1992 | Nakanishi et al. | 353/38 |
| 5,179,398 | 1/1993 | Iizuka | 353/101 |
| 5,235,362 | 8/1993 | Kronbauer | 353/71 |
| 5,283,599 | 2/1994 | Tejima et al. | 353/101 |
| 5,355,188 | 10/1994 | Biles et al. | 353/101 |
| 5,371,559 | 12/1994 | Sau-Nohe et al. | 353/31 |
| 5,400,093 | 3/1995 | Timmers | 353/101 |
| 5,461,437 | 10/1995 | Tanaka et al. | 353/71 |

FOREIGN PATENT DOCUMENTS

| | | | |
|---|---|---|---|
| 0438910 | 7/1991 | European Pat. Off. | |
| 0228620 | 9/1990 | Japan | 353/101 |

*Primary Examiner*—William Dowling
*Attorney, Agent, or Firm*—Greenblum & Bernstein P.L.C.

[57] ABSTRACT

A projector in which light emitted from a light source is made incident upon a transmission type picture panel and is projected onto a screen through a projection lens system having a condenser lens and an imaging lens. The condenser lens and the imaging lens are relatively movable with respect to the transmission type picture panel in an optical axis direction. Thus, when a projection distance from the projection lens system to the screen is varied, both the condenser lens and the imaging lens are relatively moved, with respect to the transmission type picture panel, to adjust a focus of the emitted light on the screen. A focusing method for the projector is also provided.

7 Claims, 12 Drawing Sheets

$\Delta_1$: displacement between tele and wide $\Delta_w$: displacement at wide $m_w$: magnification at wide

PROJECTOR AND FOCUSING METHOD THEREIN

BACKGROUND OF THE INVENTION

1. Field of the Invention

The present invention relates to a projector such as a liquid crystal projector, and the focusing method thereof.

2. Description of Related Art

In a liquid crystal projector, in general, a light beam emitted from a light source is made incident upon a liquid crystal panel (referred to as an LC panel), so that the light transmitted through the LC panel is projected onto a screen through a projection lens system which consists of a condenser lens and an image forming lens. In a conventional LC projector, the condenser lens is secured to the LC panel and gathers the light transmitted through the LC panel. Consequently, it is necessary to move the imaging lens (image forming lens) in the optical axis direction in order to vary the projection magnification (projection distance).

In the type of LC projector mentioned above, the projection magnification range is small, and accordingly, focusing can be effected by the movement of the imaging lens. The assignees of the present application are developing an optical system for an LC projector in which a super wide angle projection lens system is used to reduce the projection distance and thereby make the LC projector smaller, while at the same time making it possible to vary the magnification between a few times and several tens of times. Through the attempt to provide a new LC projector, it has been found that if only the imaging lens is moved in the optical axis direction, in accordance with the change in the magnification, no collimated light perpendicularly incident upon the LC panel can reach an entrance pupil of the imaging lens. Consequently, neither a high quality image can be projected, nor desired characteristics of quantity of light can be obtained. In other words, only light incident upon the LC panel at an incident angle which is not zero, i.e., light other than that normal to the LC panel, can be made incident upon the entrance pupil of the projection lens system. The contrast of the LC panel has a reliance upon the angle of light incident thereon. Namely, the contrast decreases as the deviation of the incident angle from the normal incidence increases (incident angle=0) and no high quality image can be obtained.

SUMMARY OF THE INVENTION

It is the objective of the present invention to provide a projector which has a high quality image at any projection magnification, even when the projector employs a super wide angle projection lens, and where the magnification changes are large.

To achieve the above mentioned objective, according to the present invention, a projector is provided in which light emitted from a light source is made incident upon a transmission type picture panel and is projected onto a screen through a projection lens system. The projection lens system contains a condenser lens and an imaging lens, both of which are relatively movable in an optical axis direction, with respect to the transmission type picture panel. When the projection distance is varied, from the projection lens system to the screen, both the condenser lens and the imaging lens are relatively moved to adjust the focus on the screen, with respect to the transmission type picture panel.

The condenser lens has a large size corresponding to the transmission type picture panel (liquid crystal panel). The imaging lens, which projects a bundle of light which is converged by the condenser lens, is smaller in size than the condenser lens. Accordingly, in a conventional projector, the condenser lens is secured to the LC panel, and only the imaging lens is moved to effect focusing (change of the projection magnification). Contrary to conventional technological teachings, in the present invention, the projection lens system is made of a super wide angle lens so that a high quality image and an optimum quantity of light can be obtained at any projection magnification, even if the magnification is dramatically changed.

The movement of the imaging lens and the condenser lens enables the light substantially perpendicularly incident upon the picture panel to always be made incident upon the entrance pupil of the imaging lens. Consequently, a high quality image can be projected at any magnification. In the present specification, the magnification (increase in size) is represented by "M", and the reduction (decrease in size) is represented by "m", respectively. Note that M=1/m.

Since the projection lens system uses a super wide angle lens of long length, the refracting angle of light from the condenser lens is large. Consequently, the condenser lens is preferably and practically made of a Fresnel lens.

The imaging lens and the condenser lens are moved such that substantially parallel light beams, incident upon the transmission type picture panel, are always made incident upon the entrance pupil of the imaging lens. This can be achieved (if a possible slight error is neglected), by moving the condenser lens and the imaging lens together. Preferably, the half angle of view of the projection lens system, including the condenser lens and the imaging lens, is 30° to 45°; and the projection magnification is more than five times, for example, M=−4× to −20× (m=−0.25× to −0.05×) to obtain a high quality image.

According to another aspect of the present invention, a focus adjusting method of the projector is provided, in which substantially parallel light beams are made incident upon a transmission type picture panel, and projected onto a screen through a projection lens system comprising a condenser lens and an imaging lens. Focusing on the screen is carried out by relatively moving the condenser lens, the imaging lens, and the transmission type picture panel, such that the substantially parallel beams of light, incident upon the transmission type picture panel, are made incident upon an entrance pupil of the imaging lens, regardless of the projection magnification. The transmission type picture panel used in the present invention is preferably made of a liquid crystal panel.

The present disclosure relates to subject matter contained in the Japanese patent application Nos. 06-190846 (filed on Aug. 12, 1994) and 07-104369 (filed on Apr. 27, 1995) which are expressly incorporated herein by reference in their entireties.

BRIEF DESCRIPTION OF THE DRAWINGS

The invention will be described below in detail with reference to the accompanying drawings, in which.

DESCRIPTION OF THE PREFERRED EMBODIMENT

Figure 3:
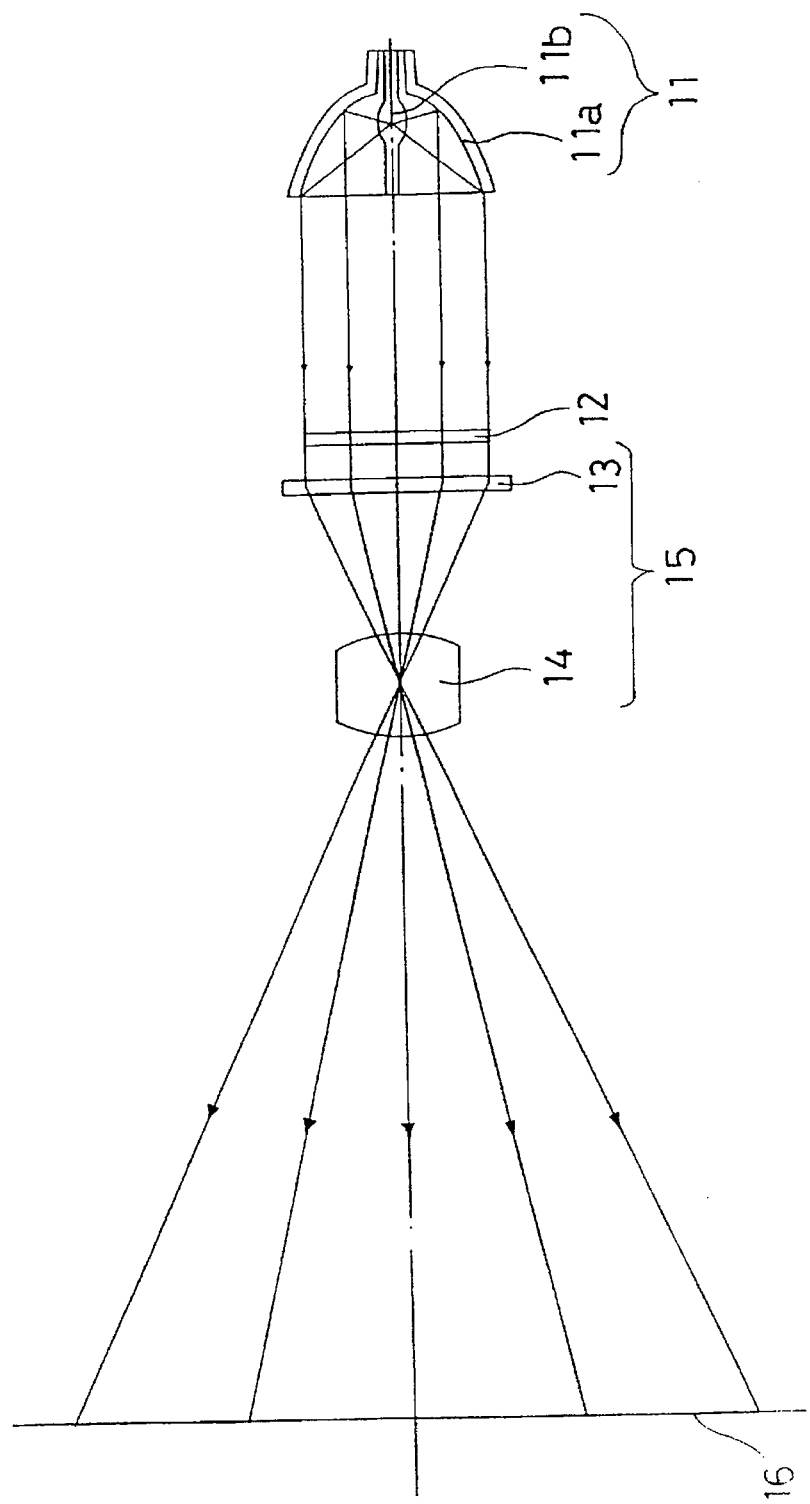
FIG. 3 is a schematic view of an optical system of a liquid crystal projector, according to the present invention.

FIG. 3 shows the whole structure of a liquid crystal projector (LC projector), according to the present invention. A bundle of substantially parallel light beams, emitted from an illuminated light source 11, is made incident upon a color liquid crystal display panel (LCD) 12. The light transmitted through the LCD 12 is then made incident upon a projection lens system 15, which consists of a Fresnel condenser lens 13 and an imaging lens 14. The Fresnel lens 13, of the projection lens system 15, gathers the parallel light beams transmitted through the LCD 12. The imaging lens 14 projects an image of the color LCD 12 onto a screen 16.

The light source 11 includes a light emitter 11b located at a focal point on a parabolic mirror 11a; so that the light emitted from the light emitter 11b is reflected by the parabolic mirror 11a as substantially parallel light beams. Although the color LCD 12 is made of a single plate in FIG. 3, the present invention can be applied to a color LC projector in which images of R (red), G (green) and B (blue) color LCDs are combined. In this case, each of the three color LCDs is constituted by the optical system shown in FIG. 3.

Figure 1:
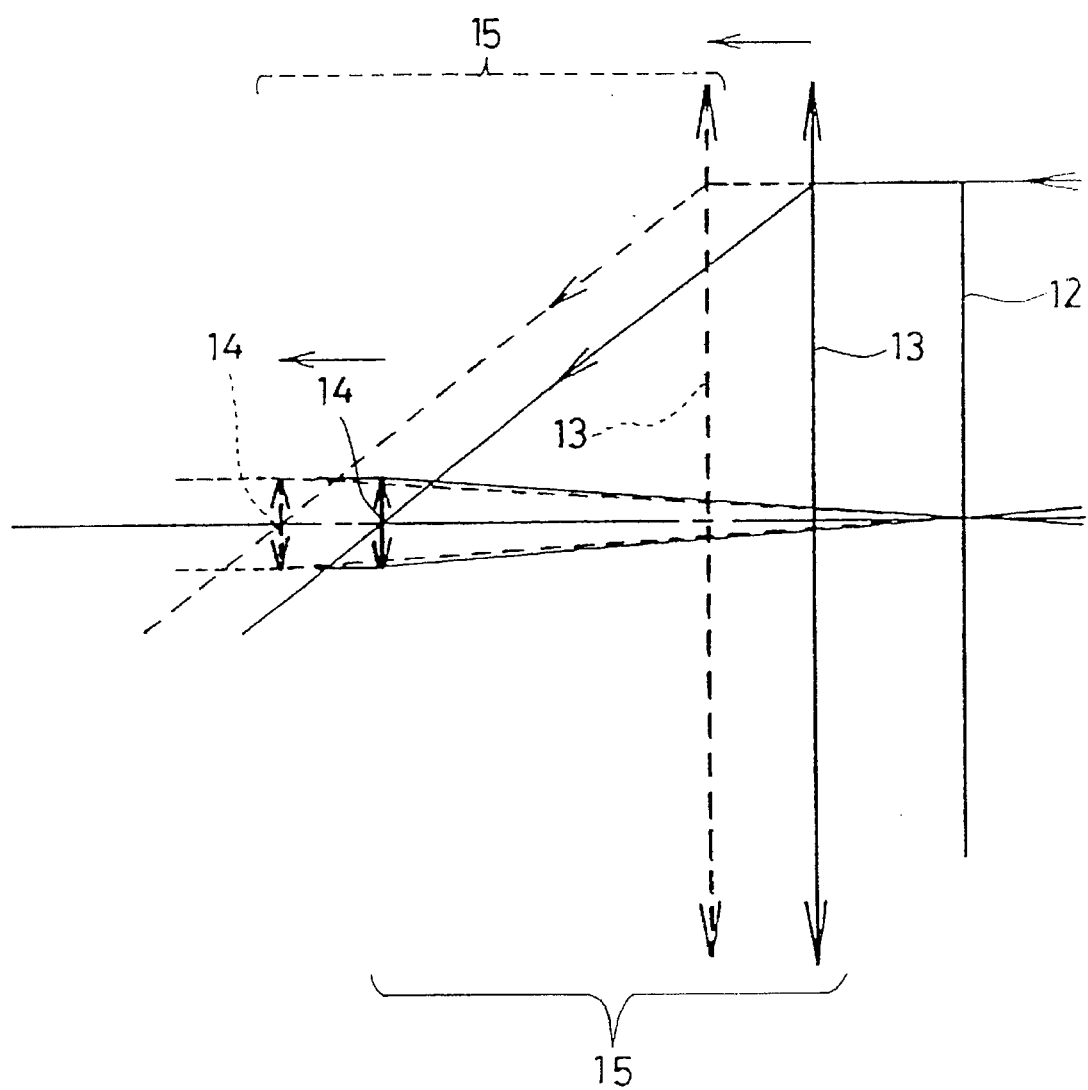
FIG. 1 is a schematic view of a projector and a focusing optical system according to the present invention.
Figure 2:
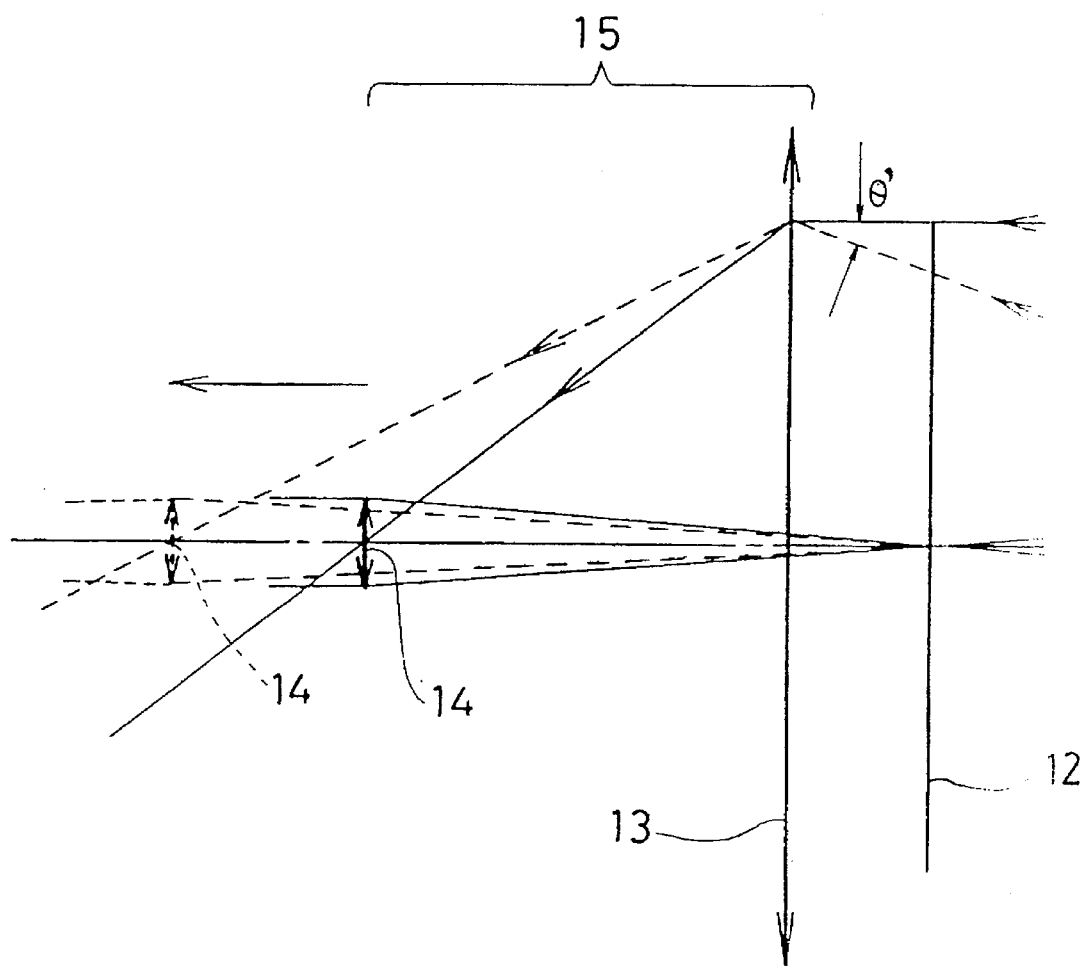
FIG. 2 is a schematic view of a known projector and focusing optical system, for the sake of comparison.

FIGS. 1 and 2 show the basic structure of a projector and the principle of the focusing method thereof, according to the present invention and the prior art, respectively.

Parallel light beams incident upon the color LCD 12 are transmitted therethrough and are gathered by the Fresnel lens 13 and projected onto the screen 16 (FIG. 3), through the imaging lens 14. The Fresnel lens 13, the imaging lens 14, and the light beams passing through the entrance pupil of the imaging lens 14, at the longest projection distance, (maximum projection magnification, i.e., ∞), are indicated by solid lines. The phantom lines designate the Fresnel lens 13, the imaging lens 14, and the beam of light passing through the entrance pupil of the imaging lens 14, at the shortest projection distance (minimum projection magnification, e.g., projected image size=10" (inches)).

In FIG. 1 (present invention), the Fresnel lens 13 and the imaging lens 14 are moved in the optical axis direction toward the screen 16 by a substantially same displacement. The displacements of the Fresnel lens 13 and the imaging lens 14 are determined such that the parallel light beams incident upon, and transmitted through, the color LCD 12 pass through the entrance pupil of the imaging lens 14 at any magnification. In other words, the Fresnel lens 13 and the imaging lens 14, constituting the projection lens system 15, are moved so that a substantially telecentric optical system is formed on the color LCD 12 at any magnification. Owing to the movement of the Fresnel lens 13 and the imaging lens 14, only the light incident upon the color LCD 12 at right angles, can be projected onto the screen 16, and hence the contrast of the color LCD 12 is kept high. Note that the Fresnel lens 13 and the imaging lens 14 are each made of a positive lens.

Looking at FIG. 2 (prior art), the Fresnel lens 13 is secured to the color LCD 12. Consequently, if the optical system is designed such that the parallel light beams incident upon, and transmitted through, the color LCD 12 pass through the entrance pupil of the imaging lens 14, for example at the longest projection distance, the light no longer passes through the entrance pupil of the imaging lens 14 at the shortest projection distance at which the imaging lens 14 is moved toward the screen 16. Namely, the light passing through the entrance pupil of the imaging lens 14, at the shortest projection distance, is light that has been made incident upon the color LCD 12 at a certain incident angle θ, which is not equal to 0 as indicated by a phantom line. Namely, the substantially parallel light beams incident upon the color LCD 12 at right angles, does not reach the entrance pupil of the imaging lens 14, but instead, only the beams of light incident upon the color LCD 12 at an inclination angle (θ'≠0) reach the entrance pupil of the imaging lens 14.

Assuming that the angle defined by the parallel light beams incident upon the color LCD 12 and the light indicated by the phantom line is θ', the contrast decreases as the angle θ' increases. If the position of the imaging lens 14 is determined such that the contrast is highest at the longest projection distance, no increasing quantity of parallel light beams, incident upon the panel 12 at right angles, reach the entrance pupil of the imaging lens 14 as the projection distance decreases. Instead thereof, the light that is made incident upon the LCD panel 12, at a large incident angle θ', increasingly reaches the entrance pupil of the imaging lens 14. It should be recalled that the deviation of the light from parallel increases, as the distance of the position of the LCD panel 12, upon which light is made incident from the center of the LCD panel 12, increases. Consequently, the contrast, which gradually lowers as the projection distance decreases, becomes lowest at the shortest projection distance.

Conversely, if the position of the imaging lens 14 is determined such that the contrast is highest at the shortest projection distance, the contrast would be lowest at the longest projection distance.

In the case when the color LCD 12 is illuminated with parallel light beams only, if the position of the imaging lens 14 is determined such that the quantity of light to be made incident upon the peripheral portion of the LCD panel 12 is optimum, then no light can be effectively made incident upon the entrance pupil of the imaging lens 14 at a short projection distance. In particular, there is a considerable loss of light made incident upon the peripheral portion of the LCD panel 12.

The same is also true when the position of the imaging lens 14 is determined such that an optimum quantity of light, at the peripheral portion, is obtained at the shortest projection distance.

In the present invention, since the light is incident upon the LCD panel 12 at right angles, and always passes through the entrance pupil of the imaging lens 14, regardless of the projection distance, no attenuation of the contrast occurs.

FIGS. 4 through 7 are explanatory views of the projection lens system 15, showing the displacement of the Fresnel lens 13 and/or the imaging lens 14. The present invention, in which both the Fresnel lens 13 and the imaging lens 14 are moved to vary the projection distance, is compared with the prior art in which only the imaging lens 14 is moved.

In FIGS. 4–7, the imaging lens 14 is indicated as a first lens group $G_1$, and the Fresnel lens 13 is indicated as a second lens group $G_2$, respectively. The focal length and the magnification of the first lens group $G_1$ and the second lens group $G_2$, are: $f_1$, $m_1$ and $f_2$, $m_2$, respectively.

Figure 4:
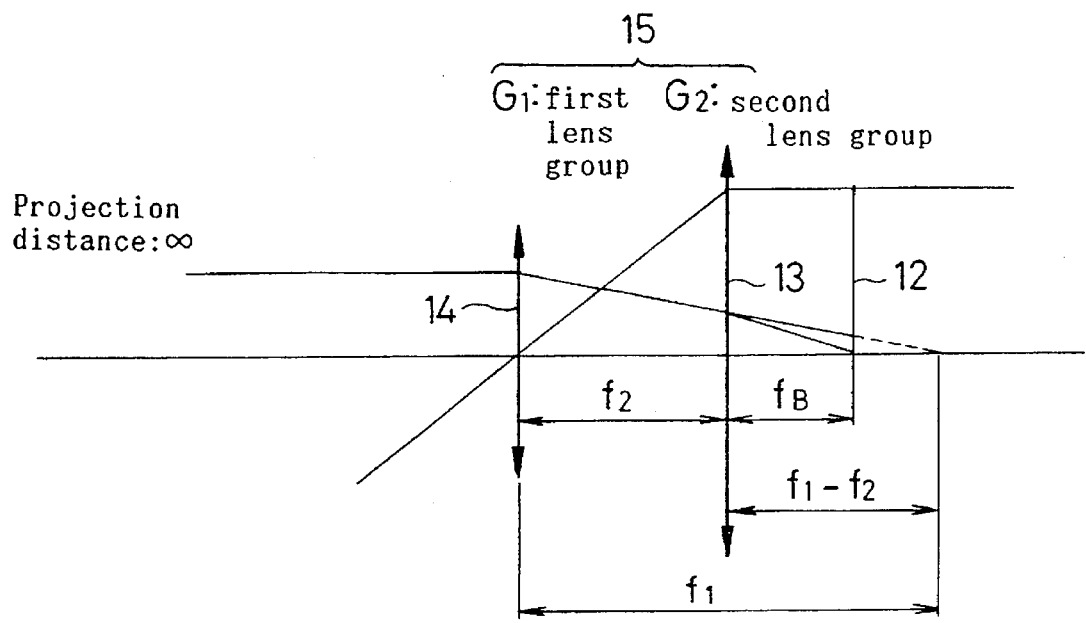
FIGS. 4, 5, 6 and 7 are schematic views of a projector and a known projector, shown in different positions.
Figure 5:
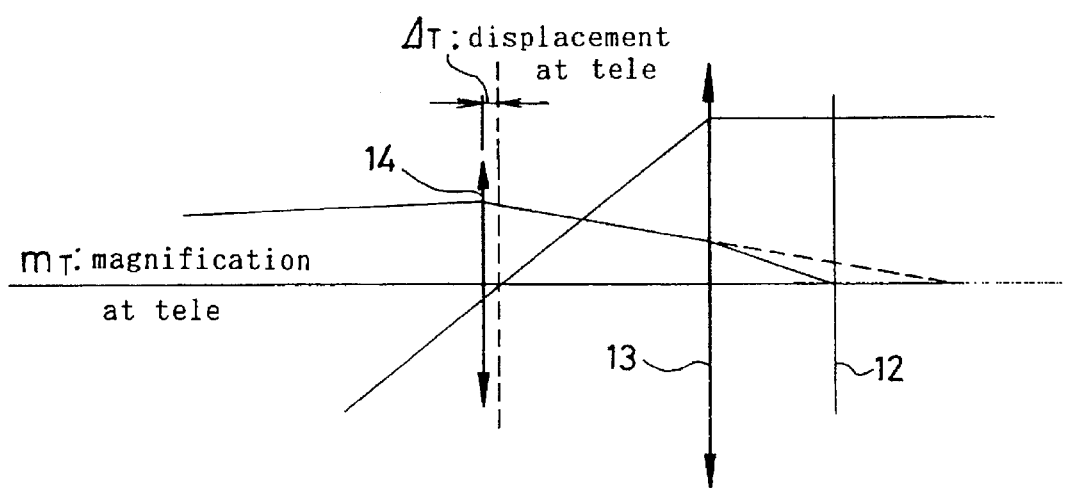
Figure 6:
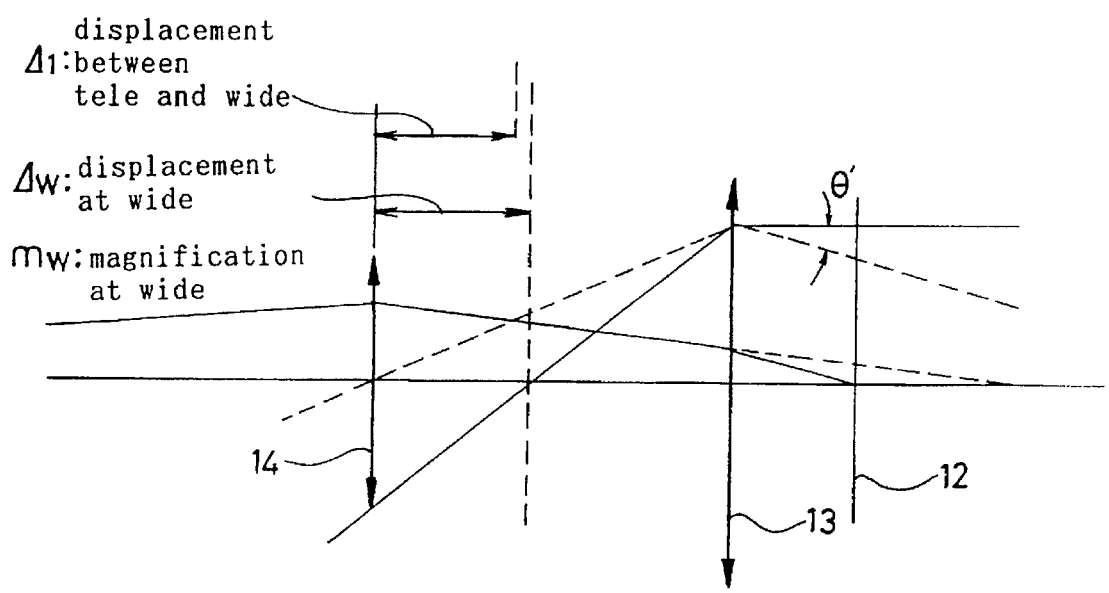
Figure 7:
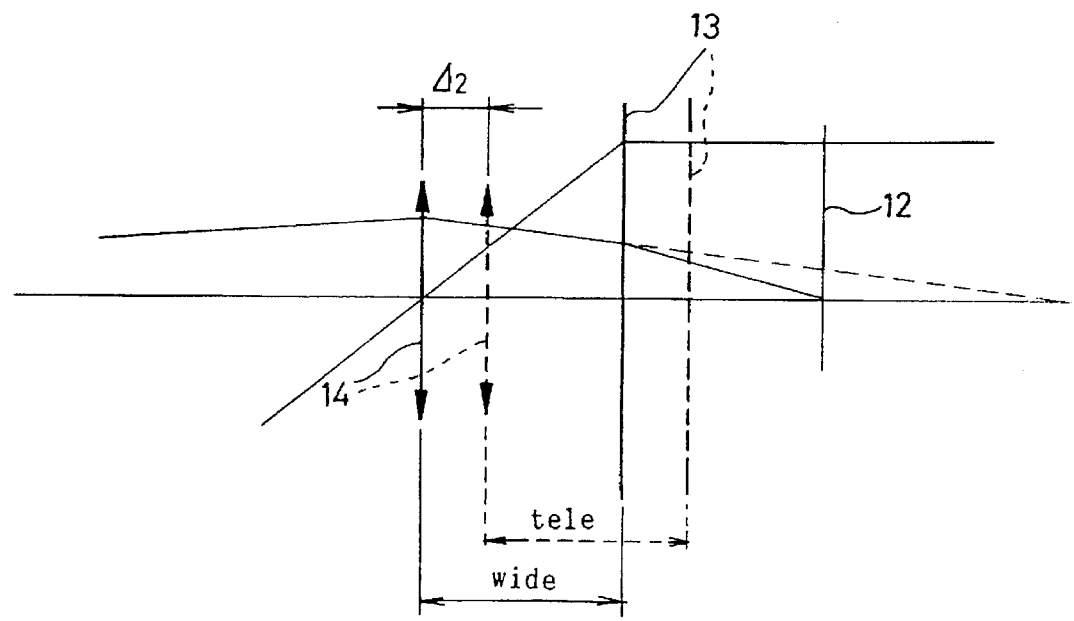

FIG. 4 shows an arrangement of the first and second lens groups $G_1$ and $G_2$, at the infinite projection distance ($\infty$); FIGS. 5 and 6 show an arrangement of the first and second lens groups when the first lens group $G_1$ is moved only to vary magnification; FIG. 7 shows a lens arrangement when both the first and second lens groups $G_1$ and $G_2$ are moved together to vary the magnification, respectively.

It is assumed that the displacements of the first lens group $G_1$, and the second lens group $G_2$, to obtain the magnifications $m_T$ and $m_W$ at the telephoto side and the wide angle side, with reference to the position of the first lens group $G_1$, shown in FIG. 4 are $\Delta_T$ (FIG. 5) and $\Delta_W$ (FIG. 6), respectively. To obtain the resultant magnifications $m_T$ and $m_W$, by the displacement of the first lens group $G_1$ (in the left hand direction in the drawings), the respective magnifications of the first lens group $G_1$ are represented by $m_T/m_2$ and $m_W/m_2$.

The displacements $\Delta_T$ and $\Delta_W$ of the first lens group $G1$ are obtained by the following equations, respectively;

$$\Delta_T = (m_T/m_2) \times f_1$$

$$\Delta_W = (m_W/m_2) \times f_1$$

The difference $\Delta_1$ in the displacement between the telephoto side and the wide angle side is given by equation (1):

$$\Delta_1 = \Delta_T - \Delta_W = (m_W - m_T) f_1/m_2 \quad (1)$$

The displacement $\Delta_2$ of the first and second lens groups $G_1$ and $G_2$ which are moved together as shown in FIG. 7, is obtained by the following equation (2):

$$\Delta_2 = (m_W - m_T) f_{12} \quad (2)$$

where $f_{12}$ designates the resultant focal length of the first and second lens groups $G_1$ and $G_2$.
Since $|m_2|<1$, we have:

$$|m_W - m_T| < |(m_W - m_T)/m_2|$$

If $f_{12} < f_1$, as in a modified embodiment which will be discussed below hereinafter, we have:

$$|m_W - m_T| \cdot f_{12} < |(m_W - m_T)/m_2| \cdot f_1$$

Namely, $$|\Delta_2| < |\Delta_1|$$

It can be understood from this formula that the displacement of the first lens group $G_1$, and/or the second lens group $G_2$, to obtain the same magnification change, is smaller when both the first and second lens groups $G_1$ and $G_2$ are moved together, than when only the first lens group $G1$ is moved.

If the reference projection distance is infinite ($\infty$) for the purpose of simplification as shown in FIG. 4, then:

$$-1/(f_1 - f_2) + 1/f_B = 1/f_2$$

$$\therefore f_B = (f_2/f_1)(f_1 - f_2)$$

Also, since $m_2 = f_B/(f_1 - f_2)$ we have:

$$m_2 = f_2/f_1$$

Therefore, $\Delta_1$ is also given by equation (3):

$$\Delta_1 = (m_W - m_T)(f_1^2/f_2) \quad (3)$$

In an example embodiment of the present invention, $m_T = -0.04$ $m_W = -0.24$ $f_1 = 55.9$ $f_2 = 39.9$ When these values are interpolated in equation (3), the displacement $\Delta_1$ between the telephoto side and the wide angle side, when only the first lens group G is moved, is: $\Delta_1 = -15.7$ (note that "–" (minus) represents the movement in the left hand direction in FIG. 4).

The displacement $\Delta_2$ between the telephoto side and the wide angle side when the first and second lens groups $G_1$ and $G_2$ are moved together, is obtained from equation (2), i.e., $$\Delta_2 = -8.0$$

(note that $f_{12} = 39.8$)

It can be seen that the displacement when the first and second lens groups $G_1$ and $G_2$ are moved together is smaller than when only the first lens group $G_1$ is moved.

The displacement $\Delta_1$ is not negligible in connection with the value of the inclination angle of the paraxial ray and the size of the pupil of the first lens group $G_1$. Namely, if only the first lens group $G_1$ is moved, the light incident upon the LCD panel 12 does not reach the pupil of the first lens group $G_1$. Moreover, the incident angle of the paraxial ray upon the LCD panel 12, that can pass through the pupil of the first lens group $G_1$, is not zero, i.e. not parallel with the optical axis of the optical system, as shown in FIG. 6.

Although the above explanation has been given when the projection distance is infinite ($\infty$), i.e., the magnification m is 0 (m=0×), the above discussion can be equally applied when the projection distance is finite, since $m_T = -0.04\times$ can be considered to be approximately equal to m=0×.

The present invention can, in particular, be advantageously applied to a projector, in which the half angle of view of the projection lens system consisting of the Fresnel lens 13 and the imaging lens 14, is 30° to 45°, and the magnification is approximately 5× or more. In a conventional projector in which the half angle of view of the projection lens system is 15° to 20°, and the magnification M on the enlargement side is M=–10× to –40× (m=–0.1× to –0.025×), the maximum angle θ' is 2° to 3°, and hence, the attenuation of the contrast is negligible and need not be considered.

In general, it is preferable that the Fresnel lens 13 and the imaging lens 14 are independently movable to ensure that light perpendicularly incident upon the color LCD panel 12 is always made incident upon the entrance pupil of the imaging lens 14. Nevertheless, if the light beams emitted from the LCD 12 are parallel, the movement of the Fresnel lens 13 and the imaging lens 14 together, does not cause the angle θ' to vary, thus resulting in no change of contrast. Furthermore, if the Fresnel lens 13 and the imaging lens 14 are integrally moved, the moving mechanism can be simplified.

In the illustrated embodiment, although the Fresnel lens 13 and the imaging lens 14 are moved relative to the color LCD 12, it is also possible to move the color LCD 12 with respect to the Fresnel lens 13 and the imaging lens 14.

Examples of numerical data in the above-mentioned embodiments of the present invention will be discussed below, with reference to FIG. 8.

Figure 8:
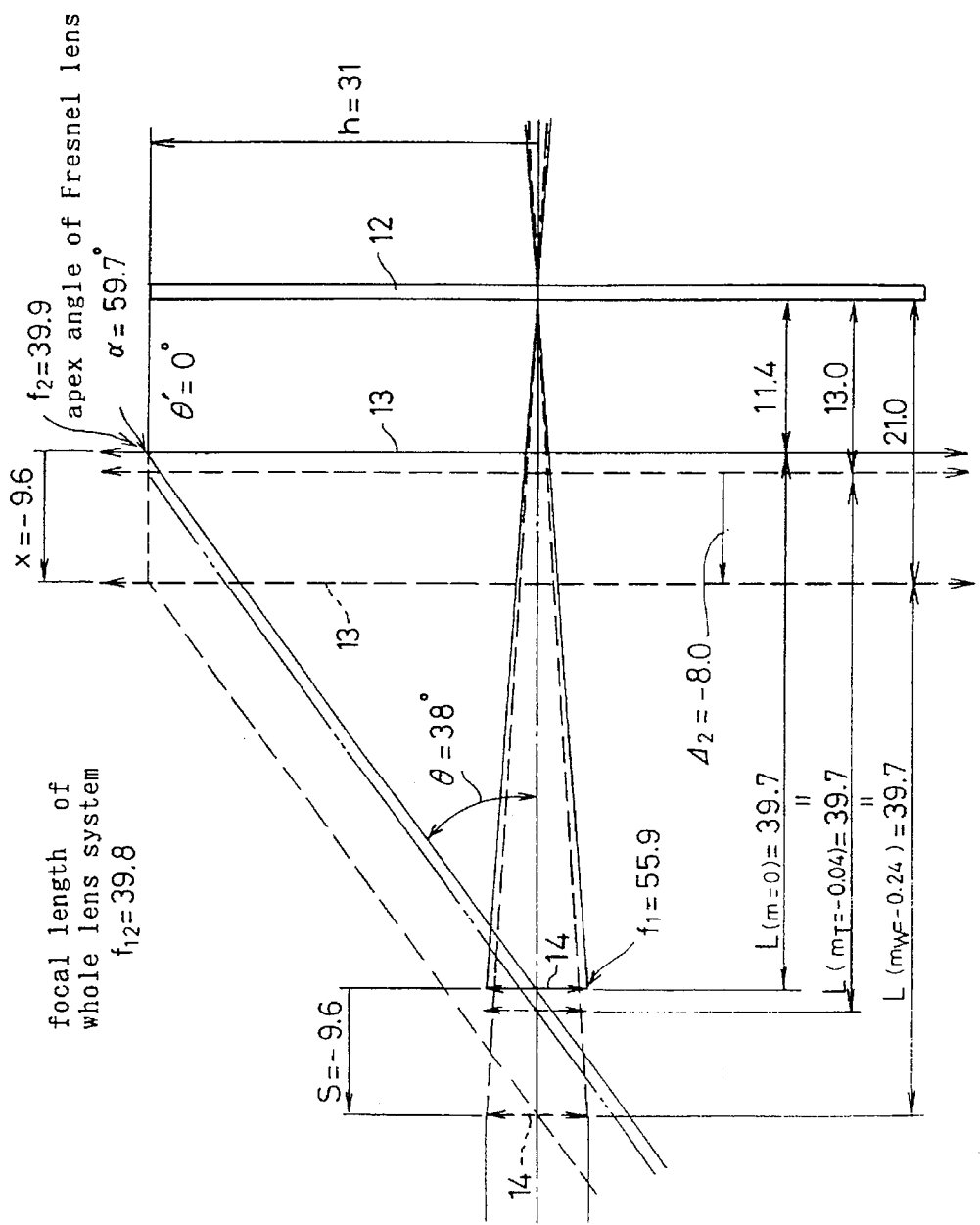
FIG. 8 is a schematic view of an embodiment of a projector, according to the present invention.

As shown in FIG. 8, $f_1$ (focal length of the imaging lens 14)=55.9 mm $f_2$ (focal length of the Fresnel lens 13)=39.9 mm $f_{12}$ (focal length of the whole lens system)=39.8 mm S: displacement of the projection lens, i.e., the entrance pupil, from the magnification m=0× to $m_W$(reduction) =−0.24× x represents a displacement of the Fresnel lens from the magnification m=0× to $m_W$=−0.24×

L represents a distance between the imaging lens and the Fresnel lens at each magnification h represents a length of the LCD 12 from the center to the peripheral edge thereof, i.e., the maximum height of the LCD 12 (=31 mm)

Φ represents a diameter of the entrance pupil of the imaging lens (=8.3 mm)

θ represents an angle of light incident upon the center of the entrance pupil of the imaging lens θ' represents an incident angle of light, incident upon the LCD 12, passing through the center of the entrance pupil of the imaging lens, i.e., deviation from the perpendicularity to the LCD 12, α represents an apex angle of the Fresnel lens at the height h (=59.7°)

Figure 12:
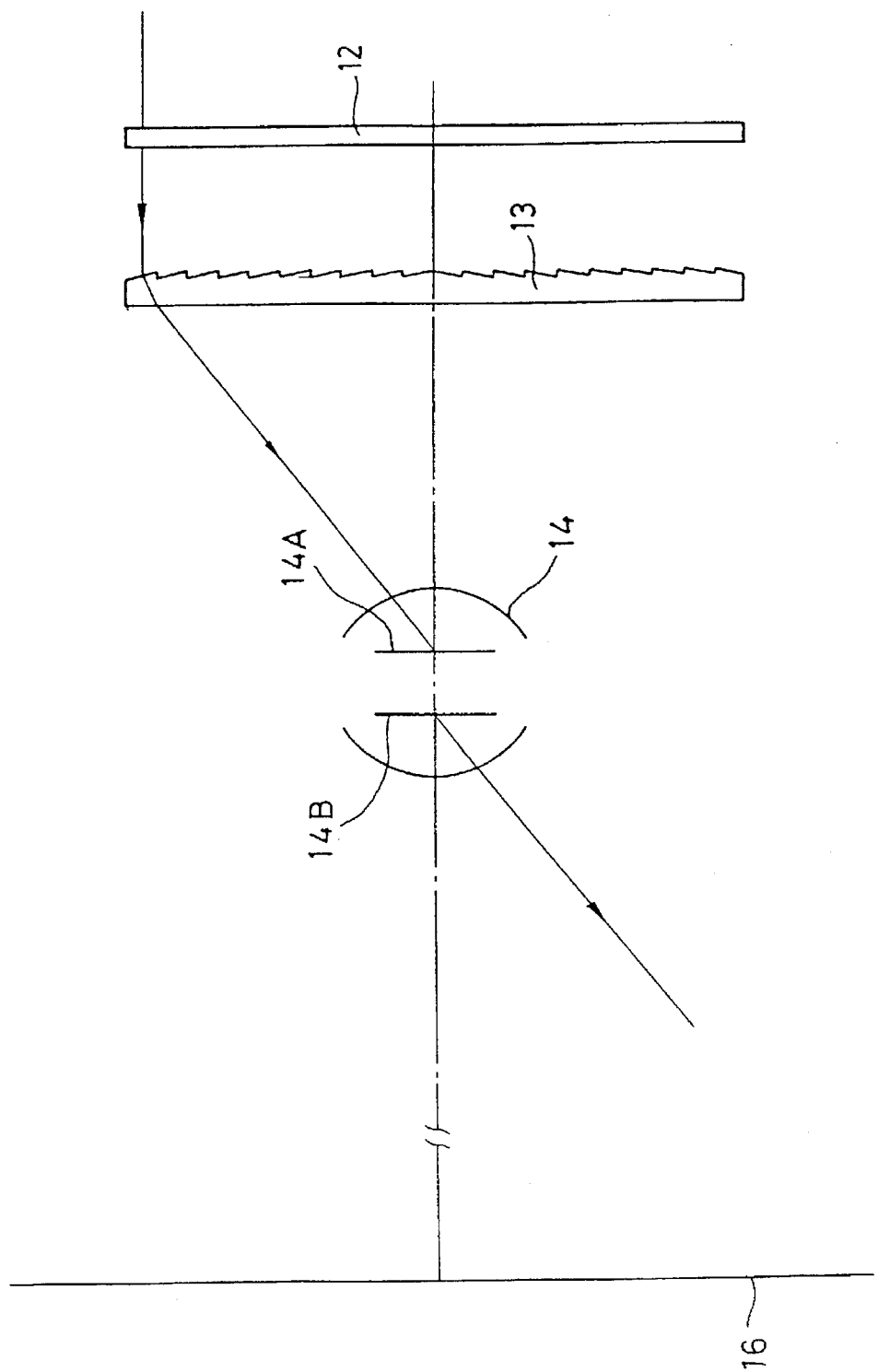
FIG. 12 is a conceptual view of a pupil of an imaging lens, according to the present invention.

In the following discussion, note that since $m_T$=−0.04× ($M_T$=−25×) is deemed to be approximately equal to m=0×, the projection distance is assumed infinite (∞), i.e., m=0×. Moreover, the imaging lens 14 is represented by the entrance pupil thereof. As shown in FIG. 12 the entrance pupil corresponds to the pupil of the projection lens as viewed from the reduction side (LCD side). In FIG. 12, numerals 14A and 14B designate the entrance pupil and exit pupil of the imaging lens 14, respectively.

Referring back to FIG. 8, values of respective parameters at x=S are as follows:

| m | L | θ | θ' |
|---|---|---|---|
| 0x | 39.7 mm | 38° | 0° |
| −0.04x | 39.7 mm | 38° | 0° |
| −0.24x | 39.7 mm | 38° | 0° |

In FIG. 8, the projection lens system 15 is made of a super wide angle lens whose half angle of view θ is 38° at the magnification m=0×. When the imaging lens 14 and the Fresnel lens 13 are moved together to obtain the magnification $m_W$=−0.24×, that is, when the projection lens system is moved for focusing so that the displacement S of the imaging lens 14 is identical to the displacement x of the Fresnel lens, the displacement of the projection lens system 15 is −9.6 mm (S=x=−9.6 mm). When the imaging lens 14 and the Fresnel lens 13 are moved together to change the magnification from $m_T$=−0.04× to $m_W$=−0.24×, $\Delta_2$=−8.0 mm. Parallel light beams transmitted through the LCD 12 pass through the Fresnel lens 13, and are then converged in the same way as m=0×. Here, it should be appreciated that the positional relationship between the Fresnel lens 13 and the imaging lens 14 is maintained constant; the light incident upon the LCD can effectively reach the entrance pupil 14A of the imaging lens 14.

Namely, the requirement to cause the beams of illuminating light, incident upon the LCD 12 in parallel with the optical axis, to pass through the entrance pupil of the imaging lens 14 is given by equation (4)

$$|(S-x)\cdot h/L| \leq \Phi/2 \qquad (4)$$

Consequently, when the displacement S of the imaging lens 14 is identical to the displacement x of the Fresnel lens 13 (S=x), that is, when the imaging lens 14 and the Fresnel lens 13 are moved integral as shown in FIGS. 1 and 8, the following relationship is established:

$$0 \leq \Phi/2$$

From this, it can be understood that the illuminating light transmitted through the LCD 12, in parallel with the optical axis, can always be made incident upon the entrance pupil 14A of the imaging lens 14, even if there is a considerable change in the projection magnification, and hence, a good image can be obtained. Moreover, if the lens system meets the requirement defined by equation (4), an image having a desired property can be obtained, even if x is not identical to S (x≠S).

Moreover, if light beams transmitted through the LCD panel 12 are not parallel beams, i.e., if the light is convergent or divergent light, the light can effectively be made incident upon the entrance pupil 14A of the imaging lens 14 when x≠S.

Figure 9:
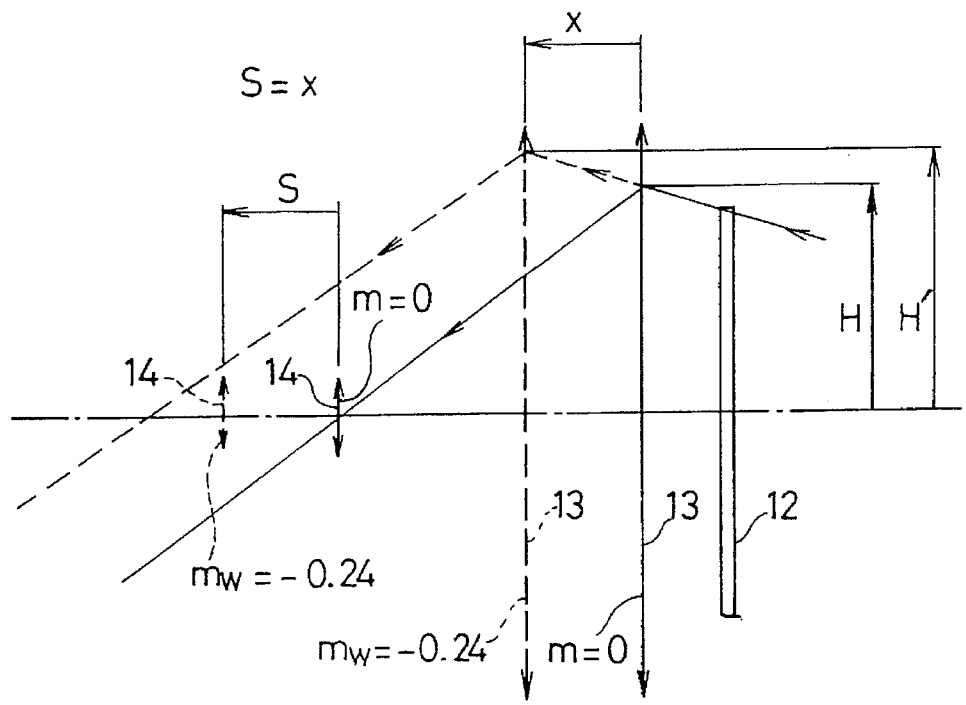
FIG. 9 is a schematic view of another embodiment of a projector, according to the present invention.

For instance, it is assumed that, for the incident light upon the LCD 12 having a high degree of divergence, the projection lens 15 and the Fresnel lens 13 are arranged such that an optimum utilization efficiency of light is obtained when the magnification is zero (m=0×), as shown in FIG. 9. In this state, if the projection lens system 15 which satisfies the relationship of x=S is moved to obtain the minimum magnification $m_W$=−0.24×, the distance between the LCD panel 12 and the Fresnel lens 13 is varied. Consequently, the height H, the incident point of the Fresnel lens 13 at m=0×, is different from the height H', the incident point of the Fresnel lens 13 at $m_W$=−0.24×. As a result, no effective light bundle can be made incident upon the entrance pupil 14A of the imaging lens, as shown in FIG. 9.

Figure 10:
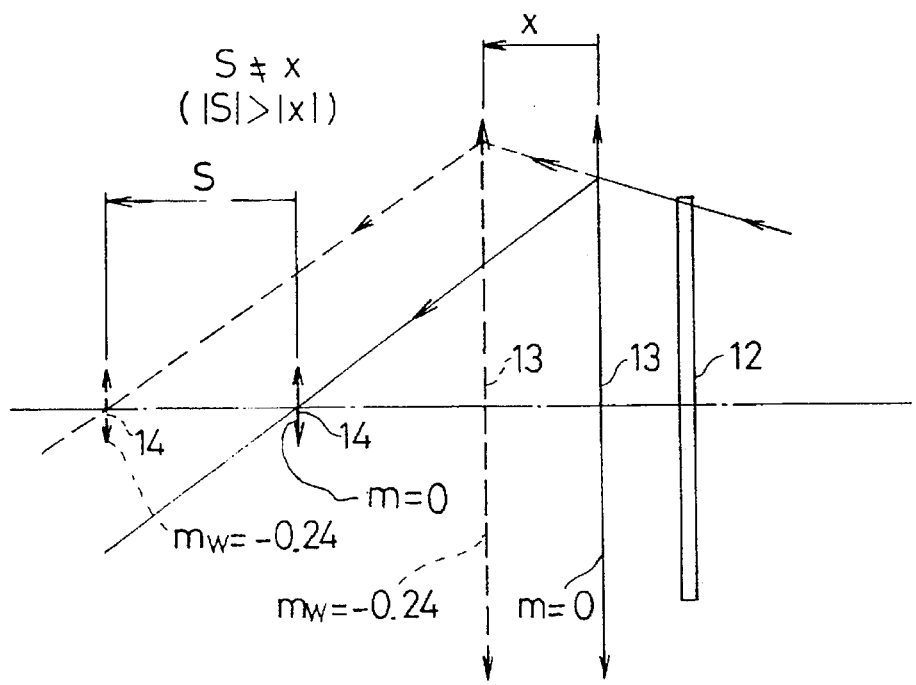
FIG. 10 is a schematic view of yet another embodiment of a projector, according to the present invention.

To solve this, the displacement S of the imaging lens 14 is set to be different from the displacement x of the Fresnel lens 13, to meet the requirement defined by equation (4), as shown in FIG. 10.

Conversely, if the incident light has a high degree of convergence, it is also possible to effectively gather the light bundle on the entrance pupil 14A of the imaging lens 14 by the setting of x≠S.

The problem caused when the Fresnel lens 13 is immovable as shown in FIG. 2 will be discussed below with reference to FIG. 11.

Figure 11:
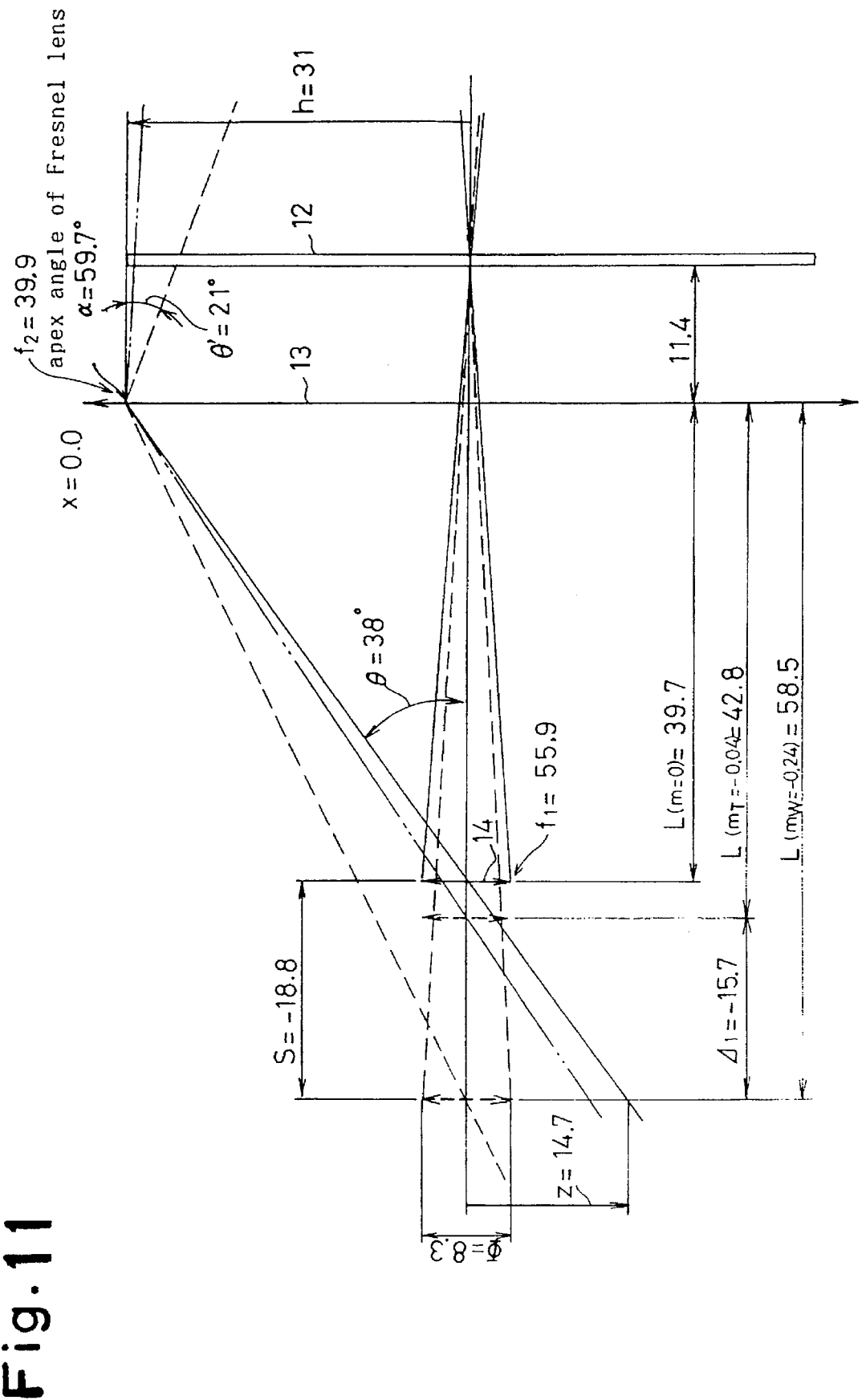
FIG. 11 is a schematic view of a known projector.

In FIG. 11, when x=0, i.e., only the imaging lens 14 is moved without moving the Fresnel lens 13, to establish a focused position, the values of "m", "L", "θ" and "θ'" mentioned above are as follows:

| m | L | θ | θ' |
|---|---|---|---|
| 0x | 39.7 mm | 38° | 0° |
| −0.04x | 42.8 mm | 36° | 3° |
| −0.24x | 58.5 mm | 28° | 21° |

The numerical conditions of the imaging lens 14 and the Fresnel lens 13 are identical to those in the above mentioned example. If the imaging lens 14 is moved to change the magnification from m=0× to $m_W$=−0.24×, without moving the Fresnel lens 13 (X=0), the displacement S of the imaging lens 14 is S=18.8 mm. When the magnification changes from $m_T=-0.04\times$ to $m_W=-0.24\times$, $\Delta_1=-15.7$ mm. It can be seen from this that the displacement of the imaging lens 14 is much larger than that when the imaging lens 14 and the Fresnel lens 13 are moved together.

Looking at the beam (h=31) perpendicularly incident upon the LCD 12, Z=14.7 at L=58.5, which is greater than the size $\Phi/2=4.15$ of the entrance pupil 14A of the imaging lens 14. On the other hand, a beam having an incident angle $\theta=28°$ passes through the entrance pupil 14A of the imaging lens 14 at L=58.5 mm. However, this beam is a beam incident upon the LCD panel 12 at $\theta'=21°$, and hence the transmittance and the contrast thereof are low, due to the angle-dependency of the liquid crystal. Therefore, no good image can be obtained.

Figure 13:
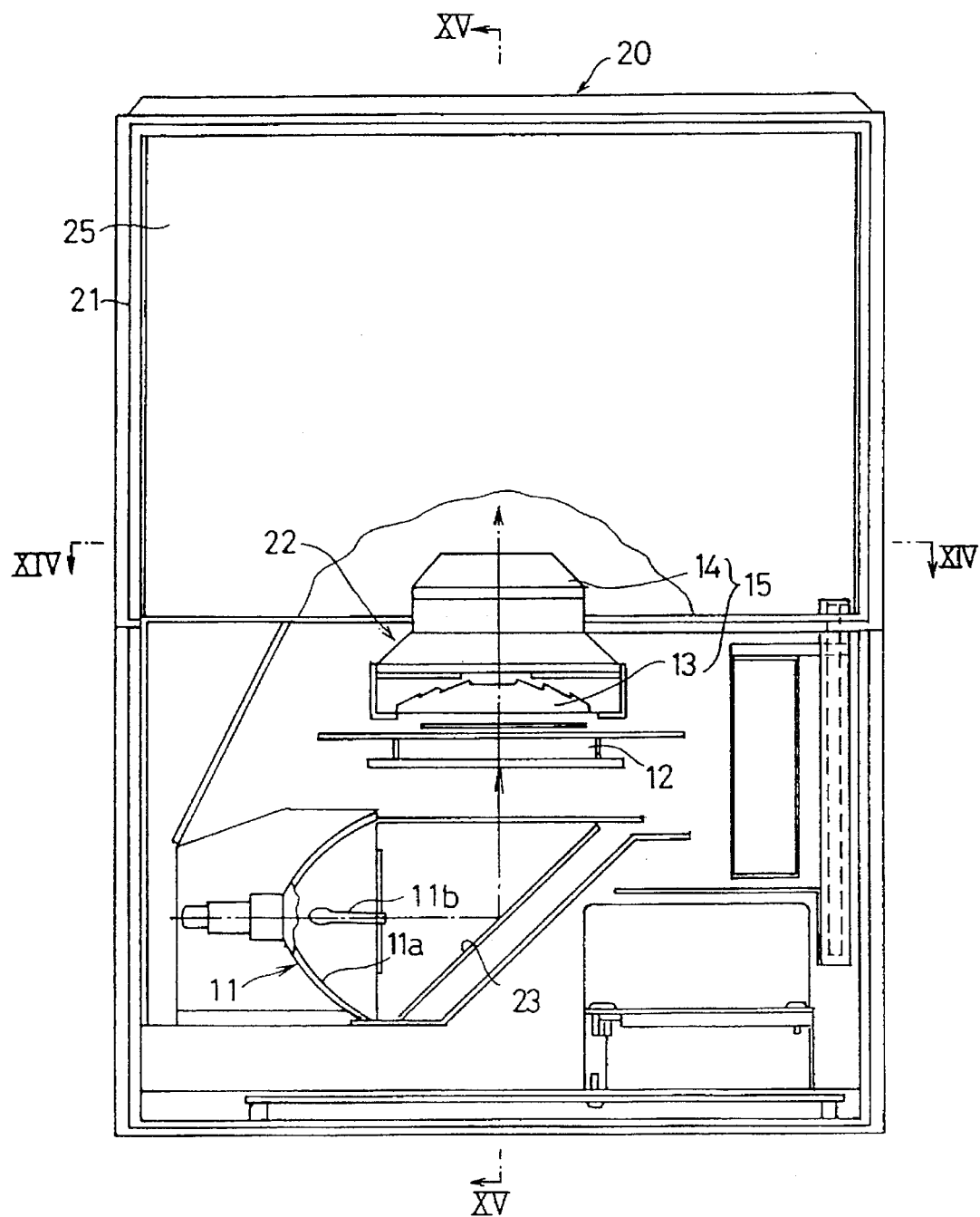
FIG. 13 is a partially broken plan view of an example of a projector, according to the present invention.
Figure 14:
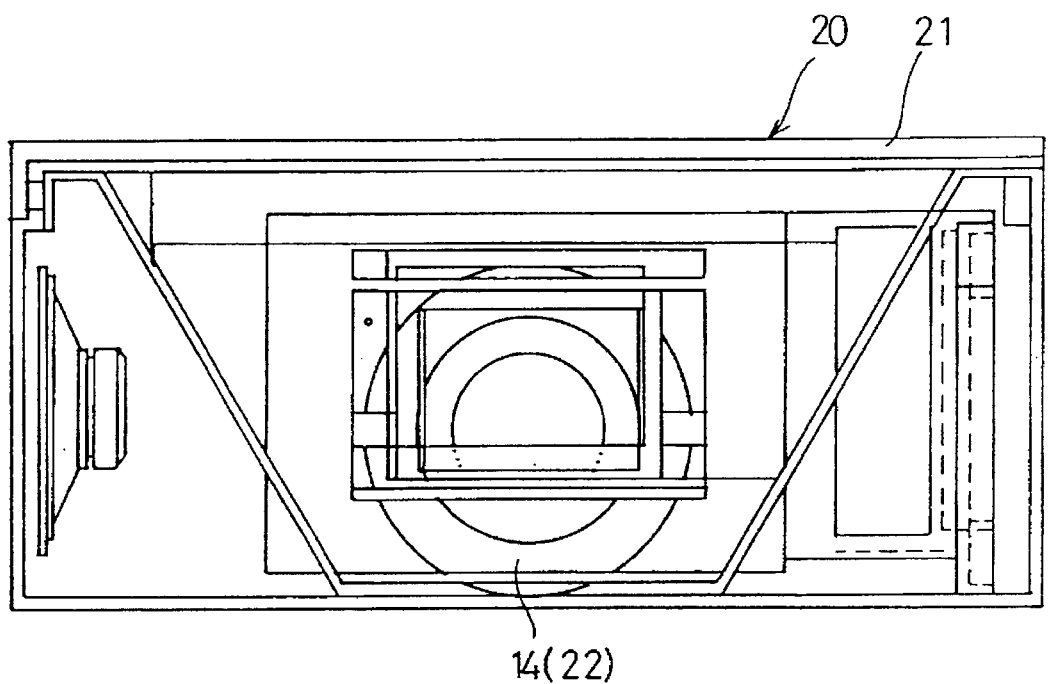
FIG. 14 is a sectional view taken along the line XIV—XIV in FIG. 13.
Figure 15:
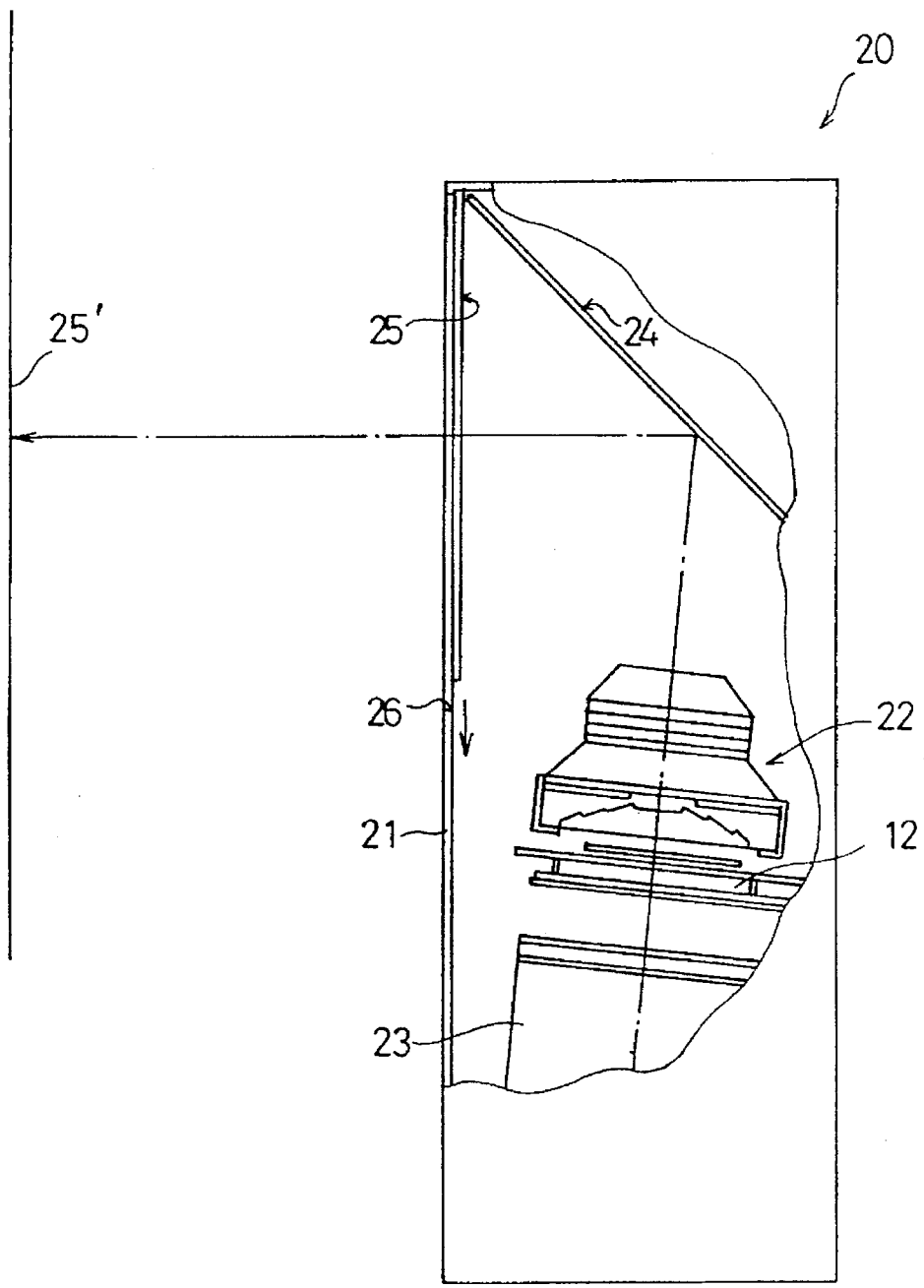
FIG. 15 is a sectional view taken along the line XV—XV in FIG. 13.

An example of an embodiment of a liquid crystal projector, to which the present invention is applied, will be discussed below, referring to FIGS. 13 through 15.

There is an illuminating light source Ii, having a parabolic mirror 11a and a light emitter 11b located at a focal point of the parabolic mirror 11a; a first reflecting mirror 23; an LCD 12; a movable lens unit 22; a second reflecting mirror 24; and a screen plate 25; in a body (casing) 21 of the LC projector 20. The movable lens unit 22 is provided with a projection lens system 15 having a Fresnel condenser lens 13 and an imaging lens 14. In the illustrated embodiment, the Fresnel lens 13 and the imaging lens 14 of the projection lens system 15 are spaced and interconnected at a predetermined distance to simplify the structure thereof. The movable lens unit 22 is movable in the optical axis direction, and is driven manually or by a motor-driven driver, per se, known.

The screen plate 25 is provided, for example of 10 inch size. When the screen plate 25 is removed from or retracted into the casing 21 to expose a projection opening 26, a bundle of beams transmitted through the imaging lens 14 of the movable lens unit 22 is projected outward. It is possible to provide an external screen 25', so that when the distance between the screen 25' and the LC projector 20 is varied, an optional projection magnification can be obtained. The focus adjustment is carried out by the movement of the whole movable lens unit 22 in the optical axis direction.

Although the above discussion has been directed to a liquid crystal projector, the present invention can be generally applied to a projecting apparatus, such as an OHP (Over Head Projector), etc.

As can be understood from the above discussion, according to the present invention, not only can a high quality image, whose contrast is always kept high regardless of the magnification be obtained, but also an optimum quantity of light can always be provided.

We claim:

1. A projector comprising:

a light source;

a transmission type picture panel;

a screen; and a projection lens system have a Fresnel condenser lens and an imaging lens, said projection lens system having a half angle of view being between 30° and 45°, and a projection magnification greater than five times;

wherein light emitted from the light source is made incident upon the transmission type picture panel and projected onto the screen through the projection lens system, and wherein said condenser lens and said imaging lens are movable, with respect to the transmission type picture panel, in an optical axis direction, so that when a projection distance from the projection lens system to the screen is varied, both said condenser lens and said imaging lens are relatively moved, with respect to the transmission type picture panel, to adjust a focus of the emitted light on the screen.

2. A projector according to claim 1, further comprising a casing in which the light source, the transmission type picture panel, the screen and the projection lens system are provided.

3. A projector according to claim 2, said screen comprising a screen plate onto which the image of the transmission type picture panel is projected, said screen being retractable from an optical path of the projection lens system, so that the image of the transmission type picture panel is projected onto a screen external to said casing.

4. A projector according to claim 2, further comprising a movable lens unit, in which the condenser lens and the imaging lens of the projecting optical system are positioned and interconnected at a predetermined distance; said movable lens unit being movable in an optical axis direction of the projecting optical system.

5. A focus adjusting method in a projector in which substantially parallel light beams are made incident upon a transmission type picture panel and projected onto a screen though a projection lens system having a Fresnel condenser lens and an imaging lens, a half angle of view of the projection lens system being between 30° to 45° and having a projection magnification greater than five times, wherein focusing of the light beam on the screen is carried out by relatively moving the condenser lens, the imaging lens, and the transmission type picture panel, such that the parallel light beams incident upon the transmission type picture panel are made incident upon an entrance pupil of the imaging lens, regardless of the projection magnification.

6. A focus adjusting method according to claim 5, wherein said imaging lens and said condenser lens are moved such that substantially parallel light beams incident upon the transmission type picture panel at right angles, are always made incident upon an entrance pupil of the imaging lens.

7. A focus adjusting method according to claim 5, wherein said imaging lens and said condenser lens are moved together.

* * * * *